United States Patent
Kent et al.

(10) Patent No.: US 8,416,896 B2
(45) Date of Patent: *Apr. 9, 2013

(54) METHOD AND SYSTEM FOR CHANNEL ESTIMATION IN A SINGLE CHANNEL MIMO SYSTEM WITH MULTIPLE RF CHAINS FOR WCDMA/HSDPA

(75) Inventors: Mark Kent, Vista, CA (US); Vinko Erceg, Cardiff, CA (US); Uri M Landau, San Diego, CA (US); Peter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,027

(22) Filed: Dec. 15, 2011

(65) Prior Publication Data

US 2012/0082257 A1  Apr. 5, 2012

Related U.S. Application Data

(63) Continuation of application No. 11/173,305, filed on Jun. 30, 2005, now Pat. No. 8,111,789.

(60) Provisional application No. 60/616,687, filed on Oct. 6, 2004.

(51) Int. Cl.
| | | |
|---|---|---|
| H03D 1/04 | (2006.01) | |
| H03D 1/06 | (2006.01) | |
| H03K 5/01 | (2006.01) | |
| H03K 6/04 | (2006.01) | |
| H04B 1/10 | (2006.01) | |
| H04L 1/00 | (2006.01) | |
| H04L 25/08 | (2006.01) | |

(52) U.S. Cl.
USPC ........... 375/346; 375/148; 375/231; 375/232; 375/345; 455/136; 455/138; 342/377

(58) Field of Classification Search .................. 342/350, 342/368, 377, 385, 417, 442; 375/229–233, 375/235, 316, 322, 329, 345, 346, 349, 350; 455/73, 550.1, 561, 562.13, 132, 133, 136, 455/137, 350, 368, 377, 385, 417, 442
See application file for complete search history.

(56) References Cited

U.S. PATENT DOCUMENTS

| 3,638,125 A | 1/1972 | Goell |
| 4,144,411 A | 3/1979 | Frenkiel |

(Continued)

OTHER PUBLICATIONS

Non-Final Rejection mailed Mar. 27, 2012 for U.S. Appl. No. 13/327,011, filed Dec. 15, 2011; 22 pages.

(Continued)

Primary Examiner — David C. Payne
Assistant Examiner — James M Perez
(74) Attorney, Agent, or Firm — Sterne, Kessler, Goldstein & Fox P.L.L.C.

(57) ABSTRACT

Aspects of a method and system for channel estimation in a MIMO communication system with multiple RF chains for WCDMA/HSDPA may comprise receiving a plurality of communication signals from a plurality of transmit antennas. A plurality of vectors of baseband combined channel estimates may be generated based on phase rotation of the received plurality of communication signals. A matrix of processed baseband combined channel estimates may be generated based on the generated plurality of vectors of baseband combined channel estimates. A plurality of amplitude and phase correction signals may be generated based on the generated plurality of vectors of baseband combined channel estimates. An amplitude and a phase of at least a portion of the received plurality of communication signals may be adjusted based on the generated plurality of amplitude and phase correction signals, respectively.

20 Claims, 13 Drawing Sheets

U.S. PATENT DOCUMENTS

| | | | |
|---|---|---|---|
| 5,852,630 A | | 12/1998 | Langberg et al. |
| 6,097,773 A | * | 8/2000 | Carter et al. ............... 375/347 |
| 6,115,409 A | | 9/2000 | Upadhyay et al. |
| 6,128,276 A | | 10/2000 | Agee |
| 7,020,175 B2 | | 3/2006 | Frank |
| 7,167,507 B2 | | 1/2007 | Mailaender et al. |
| 7,286,593 B1 | | 10/2007 | Banerjee |
| 7,346,121 B2 | | 3/2008 | Dabak et al. |
| 7,477,695 B2 | | 1/2009 | Takano |
| 7,570,696 B2 | | 8/2009 | Maltsev et al. |
| 7,593,493 B2 | | 9/2009 | Kent et al. |
| 7,715,798 B2 | | 5/2010 | Onggosanusi et al. |
| 7,995,537 B2 | | 8/2011 | Kent et al. |
| 8,098,776 B2 | | 1/2012 | Kent et al. |
| 2001/0020919 A1 | * | 9/2001 | Maruta ..................... 343/729 |
| 2002/0111780 A1 | | 8/2002 | Sy |
| 2003/0016768 A1 | | 1/2003 | Huang et al. |
| 2003/0031234 A1 | | 2/2003 | Smee et al. |
| 2003/0094976 A1 | * | 5/2003 | Miyashita ..................... 327/40 |
| 2003/0199264 A1 | * | 10/2003 | Holenstein et al. ........... 455/324 |
| 2003/0235146 A1 | | 12/2003 | Wu et al. |
| 2003/0235292 A1 | | 12/2003 | Cheng |
| 2004/0192218 A1 | | 9/2004 | Oprea |
| 2004/0264600 A1 | * | 12/2004 | Kao et al. ..................... 375/316 |
| 2005/0020310 A1 | * | 1/2005 | Nakaya et al. .............. 455/562.1 |
| 2005/0025093 A1 | | 2/2005 | Yun et al. |
| 2005/0088215 A1 | | 4/2005 | Suissa et al. |
| 2005/0128985 A1 | | 6/2005 | Liberti, Jr. et al. |
| 2005/0184906 A1 | * | 8/2005 | Nakaya et al. ............... 342/377 |
| 2005/0207476 A1 | | 9/2005 | Anderson |
| 2005/0243898 A1 | | 11/2005 | Reznik et al. |
| 2005/0260962 A1 | * | 11/2005 | Nazrul et al. .............. 455/226.1 |
| 2006/0153059 A1 | | 7/2006 | Spence et al. |
| 2007/0015545 A1 | | 1/2007 | Leifer et al. |
| 2008/0170533 A1 | | 7/2008 | Cyzs et al. |

OTHER PUBLICATIONS

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

Simon Haykin, McMaster University; Mathini Sellathurai, Yvo Dejong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

3GPP TS 25.214 V6.2.0 (Jun. 2004) Technical Specification; 3rd Generation Partnership Project: Technical Specification Group Radio Access Network: Physical Layer Procedures (FDD) (Release 6), pp. 1-64; Copyright 2004, France.

Jack H. Winters, Optimum Combining for Indoor Radio Systems With Multiple Users, IEEE Trans. on Communications, vol. Com-35, No. 11, Nov. 1987, pp. 1222-1230.

* cited by examiner

METHOD AND SYSTEM FOR CHANNEL ESTIMATION IN A SINGLE CHANNEL MIMO SYSTEM WITH MULTIPLE RF CHAINS FOR WCDMA/HSDPA

CROSS-REFERENCE TO RELATED APPLICATIONS/INCORPORATION BY REFERENCE

This patent application is a continuation of U.S. Ser. No. 11/173,305 filed Jun. 30, 2005, which application makes reference to, claims priority to and claims benefit from U.S. provisional patent application Ser. No. 60/616,687 filed Oct. 6, 2004.

This application also makes reference to:
U.S. application Ser. No. 11/173,870 filed Jun. 30, 2005;
U.S. application Ser. No. 11/174,303 filed Jun. 30, 2005;
U.S. application Ser. No. 11/173,502 filed Jun. 30, 2005;
U.S. application Ser. No. 11/173,871 filed Jun. 30, 2005;
U.S. application Ser. No. 11/173,964 filed Jun. 30, 2005;
U.S. application Ser. No. 11/173,252 filed Jun. 30, 2005;
U.S. application Ser. No. 11/174,252 filed Jun. 30, 2005;
U.S. application Ser. No. 11/172,756 filed Jun. 30, 2005;
U.S. application Ser. No. 11/172,759 filed Jun. 30, 2005;
U.S. application Ser. No. 11/173,689 filed Jun. 30, 2005;
U.S. application Ser. No. 11/173,304 filed Jun. 30, 2005;
U.S. application Ser. No. 11/173,129 filed Jun. 30, 2005;
U.S. application Ser. No. 11/172,779 filed Jun. 30, 2005;
U.S. application Ser. No. 11/172,702 filed Jun. 30, 2005;
U.S. application Ser. No. 11/173,727 filed Jun. 30, 2005;
U.S. application Ser. No. 11/173,726 filed Jun. 30, 2005;
U.S. application Ser. No. 11/172,781 filed Jun. 30, 2005;
U.S. application Ser. No. 11/174,067 filed Jun. 30, 2005;
U.S. application Ser. No. 11/173,854 filed Jun. 30, 2005;
U.S. application Ser. No. 11/173,911 filed Jun. 30, 2005; and
U.S. application Ser. No. 11/174,403 filed Jun. 30, 2005.

The above referenced applications are hereby incorporated herein by reference in their entirety.

FIELD OF THE INVENTION

Certain embodiments of the invention relate to channel estimation. More specifically, certain embodiments of the invention relate to a method and system for channel estimation in a single channel multi-input multi-output (MIMO) system with multiple RF chains for WCDMA/HSDPA.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1A is a technology timeline indicating evolution of existing WCDMA specification to provide increased downlink throughput. Referring to FIG. 1A, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI. The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for channel estimation in a single channel multi-input multi-output (MIMO) system with multiple RF chains for WCDMA/HSDPA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method for channel estimation in a communication system. Aspects of the method may comprise receiving a plurality of communication signals from a plurality of transmit antennas. A plurality of vectors of baseband combined channel estimates may be generated based on phase rotation of the received plurality of communication signals. A matrix of processed baseband combined channel estimates may be generated based on the generated plurality of vectors of baseband combined channel estimates. A plurality of amplitude and phase correction signals may be generated based on the generated plurality of vectors of baseband combined channel estimates. An amplitude and a phase of at least a portion of the received plurality of communication signals may be adjusted based on the generated plurality of amplitude and phase correction signals, respectively.

A plurality of weights may be determined that may be applied to each of the received plurality of communication signals based on the generated plurality of amplitude and phase correction signals. The phase and amplitude of at least a portion of the received plurality of communication signals may be adjusted based on the determined plurality of weights. The determined plurality of weights may be calculated utilizing an adaptive algorithm such as a least mean squares algorithm, for example. The received plurality of communication signals may be further filtered, amplified and converted to digital signals. The generated plurality of baseband combined channel estimates may be derived via rotation at additional antennas. The received plurality of communication signals may be modulated into in phase (I) components and quadrature (Q) components.

Figure 1A:
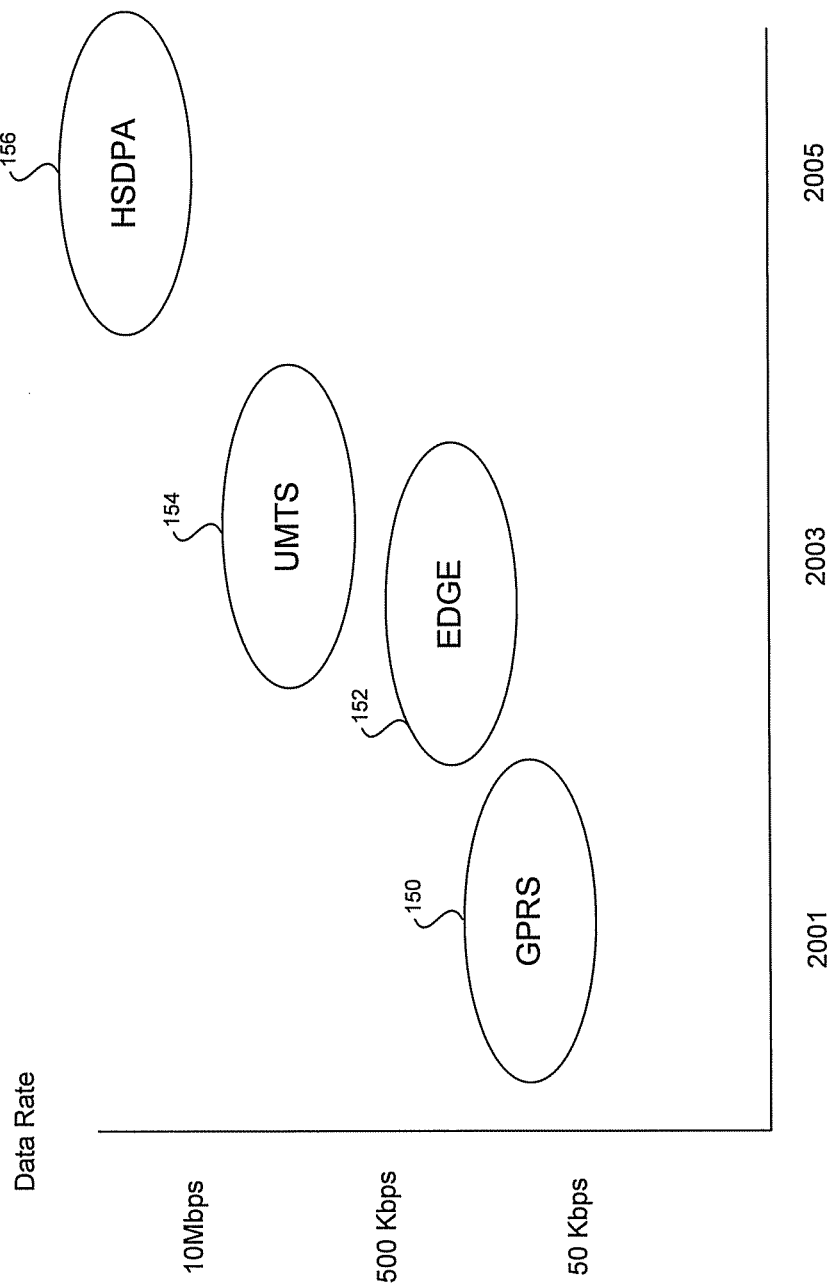
FIG. 1A is a technology timeline indicating evolution of existing WCDMA specification to provide increased downlink throughput.
Figure 1B:
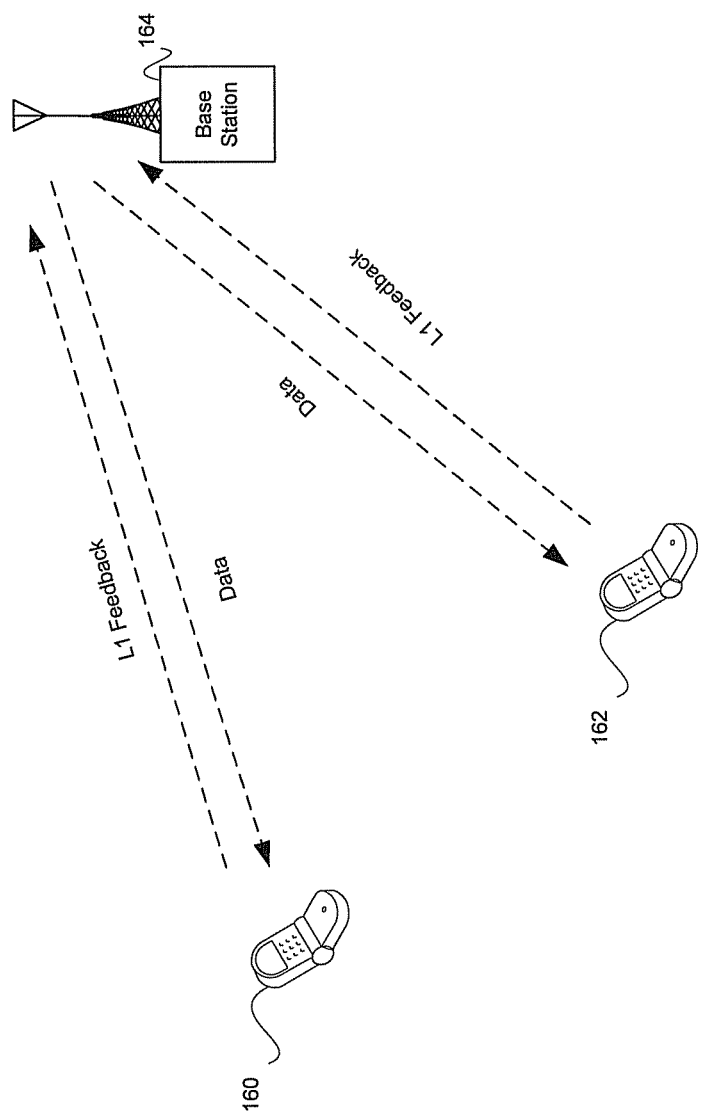
FIG. 1B illustrates an exemplary HSDPA distributed architecture that achieves low delay link adaptation, in connection with an embodiment of the invention.

FIG. 1B illustrates an exemplary HSDPA distributed architecture that achieves low delay link adaptation, in connection with an embodiment of the invention. Referring to FIG. 1B, there is shown terminals 110 and 112 and a base station (BS) 114. HSDPA is built on a distributed architecture that achieves low delay link adaptation by placing key processing at the BS 114 and thus closer to the air interface as illustrated. Accordingly, the MAC layer at the BS 114 is moved from Layer 2 to Layer 1, which implies that the systems may respond in a much faster manner with data access. Fast link adaptation methods, which are generally well established within existing GSM/EDGE standards, include fast physical layer (L1) retransmission combining and link adaptation techniques. These techniques may deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
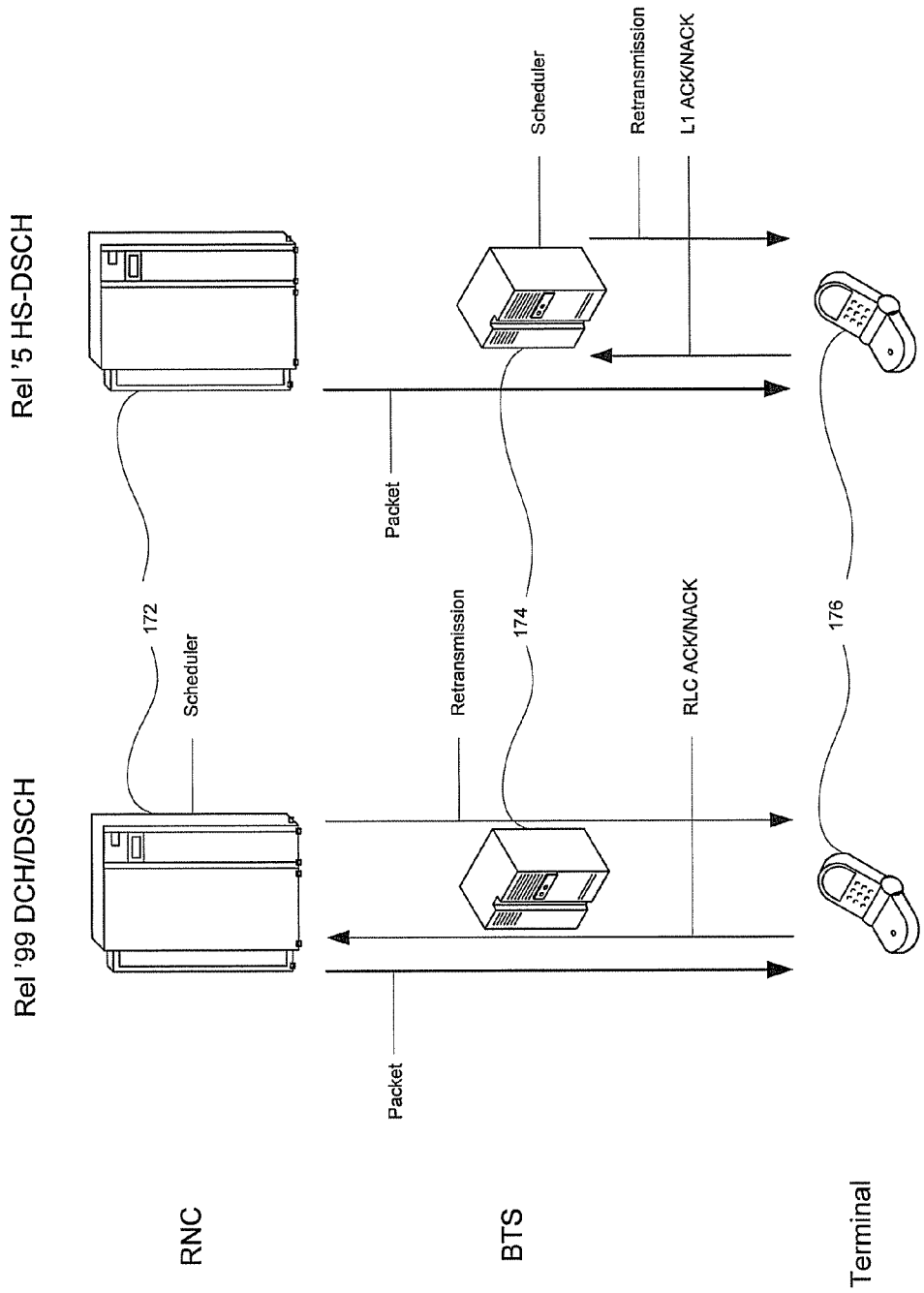
FIG. 1C illustrates an exemplary Layer 1 HARQ control situated in a base station to remove retransmission-related scheduling and storing from the radio network controller, in connection with an embodiment of the invention.

FIG. 1C illustrates an exemplary Layer 1 HARQ control situated in a base station to remove retransmission-related scheduling and storing from the radio network controller, in connection with an embodiment of the invention. Referring to FIG. 1C, there is shown a hybrid automatic repeat request (HARQ) operation, which is an operation designed to reduce the delay and increase the efficiency of retransmissions. Layer 1 HARQ control is situated in the Node B, or base station (BS) 174, thus removing retransmission-related scheduling and storing from the radio network controller RNC 172. This HARQ approach avoids hub delay and measurably reduces the resulting retransmission delay.

For example, when a link error occurs, due to signal interference or other causes, a mobile terminal 176 may request the retransmission of the data packets. While current-generation WCDMA networks handle those retransmission requests through the radio network controller 172, HSDPA retransmission requests are managed at the base station 174. Using this approach, packets are combined at the physical (PHY) layer and the mobile terminal 176 stores the received data packets in soft memory. If decoding has failed, the new transmission is combined with the old transmission before channel decoding. The HSDPA approach allows previously transmitted bits from the original transmission to be combined with the retransmission. This combining strategy provides improved decoding efficiencies and diversity gains while minimizing the need for additional repeat requests. The combining may include different puncturing pattern therefore providing code and time diversity.

While the spreading factor may be fixed, the coding rate may vary between ¼ and ¾, and the HSDPA specification supports the use of 5, 10 or 15 multicodes, for example. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 174, and thus closer to the air interface, and by using information about channel quality, terminal capabilities, QoS, and power/code availability, HSDPA may achieve more efficient scheduling of data packet transmissions. Moving these intelligent network operations to the base station 174 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 174, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2 ms frame length, compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may supports 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) may carry ARQ acknowledgements, downlink quality feedback and other necessary control information on the uplink.

Figure 1D:
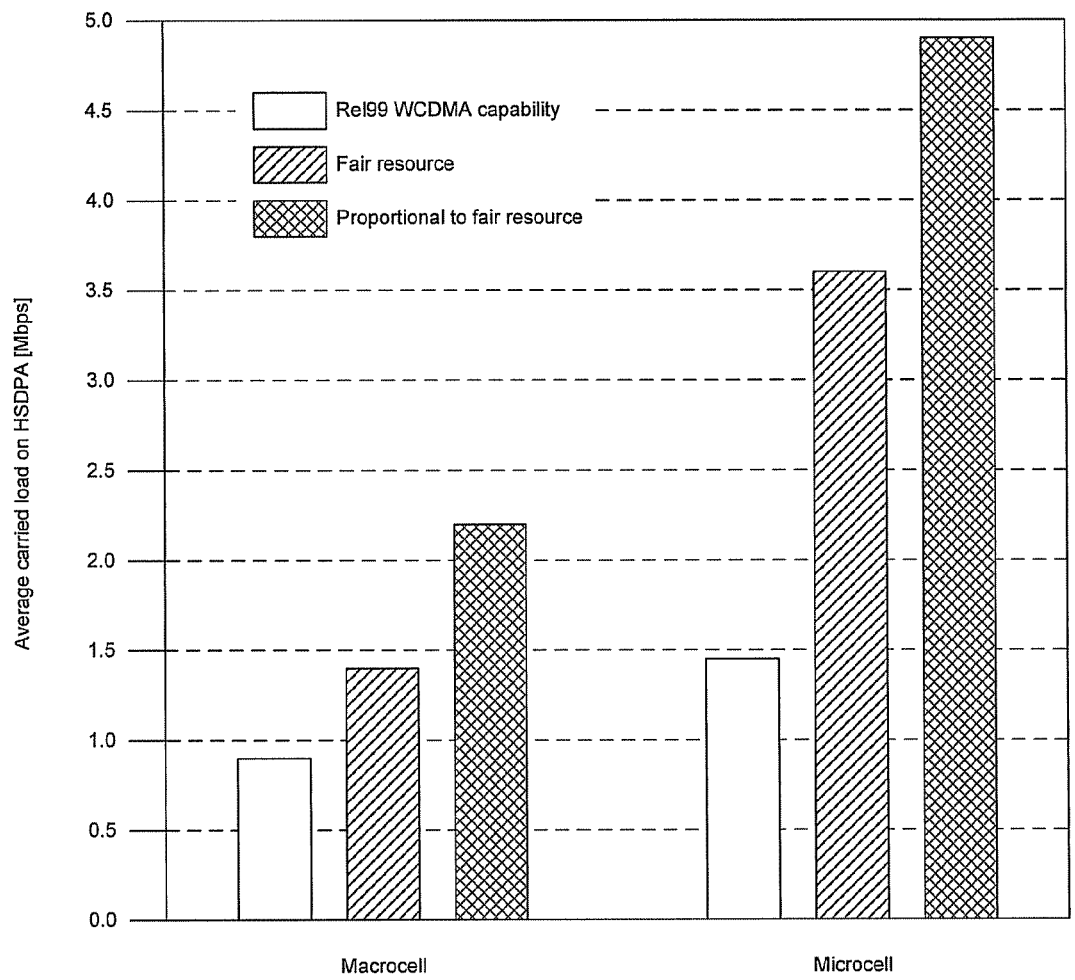
FIG. 1D is a chart illustrating exemplary average carried loads for HSDPA-based macrocell and microcell systems, in connection with an embodiment of the invention.

FIG. 1D is a chart illustrating exemplary average carried loads for HSDPA-based macrocell and microcell systems, in connection with an embodiment of the invention. Referring to FIG. 1D, in practical deployments, HSDPA more than doubles the achievable peak user bit rates compared to WCDMA Release 99. With bit rates that are comparable to DSL modem rates, HS-DSCH may deliver user bit rates in large macrocell environments exceeding 1 Mbit/s, and rates in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit's/Hz/cell.

Figure 1E:
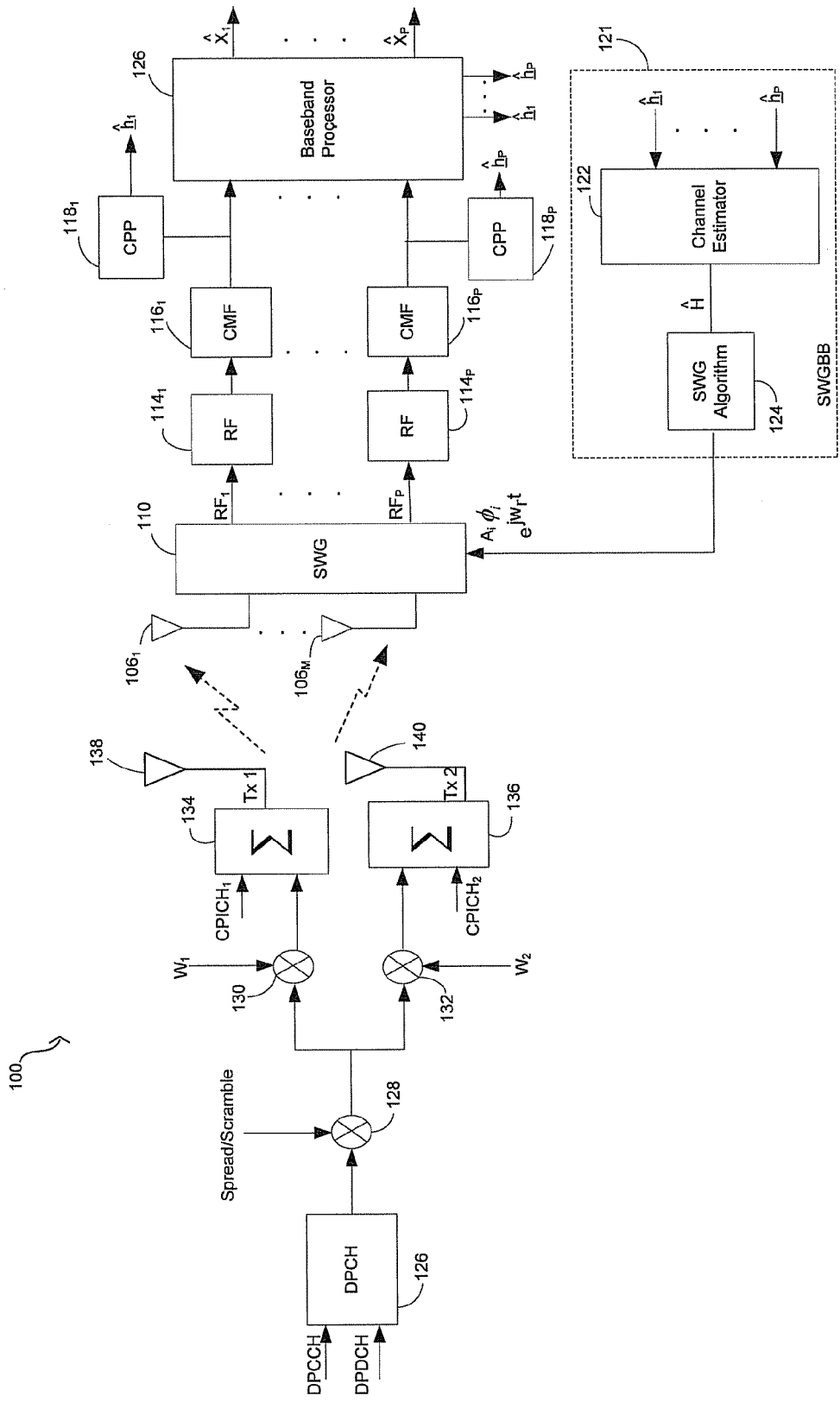
FIG. 1E is a block diagram of exemplary 2 Tx antenna and M Rx antenna wireless communication system with multiple RF chains and receiver channel estimation, in accordance with an embodiment of the invention.

FIG. 1E is a block diagram of exemplary 2 Tx antenna and M Rx antenna wireless communication system with multiple RF chains and receiver channel estimation, in accordance with an embodiment of the invention. Referring to FIG. 1E, the wireless system 100 may comprise a dedicated physical channel (DPCH) block 126, a plurality of mixers 128, 130 and 132, a plurality of combiners 134 and 136, a first transmit antenna (Tx 1) 138 and an additional transmit antenna (Tx 2) 140 on the transmit side. On the receive side, the wireless system 100 may comprise a plurality of receive antennas $106_{1...M}$, a single weight generator (SWG) 110, a plurality of RF blocks $114_{1...P}$, a plurality of chip matched filters (CMF) $116_{1...P}$, a baseband (BB) processor 126 and a single weight generator baseband processor (SWGBB) 121. The SWGBB 121 may comprise a channel estimator 122 and a single weight generator (SWG) algorithm block 124.

The DPCH 126 may be adapted to receive a plurality of input channels, for example, a dedicated physical control channel (DPCCH) and a dedicated physical data channel (DPDCH). The DPCH 126 may simultaneously control the power of DPCCH and DPDCH. The mixer 128 may be adapted to mix the output of DPCH 126 with a spread and/or scrambled signal to generate a spread complex valued signal that may be input to mixers 130 and 132. The mixers 130 and 132 may weight the complex valued input signals with weight factors $W_1$ and $W_2$, respectively, and may generate outputs to a plurality of combiners 134 and 136 respectively. The combiners 134 and 136 may combine the outputs generated by mixers 130 and 132 with common pilot channel 1 (CPICH1) and common pilot channel 2 (CPICH2) respectively. The common pilot channels 1 and 2 may have a fixed channelization code allocation that may be utilized to measure the phase amplitude signal strength of the channels. The weights $W_1$ and $W_2$ may be utilized, for example, phase and or amplitude adjustments and may be generated by the single weight generator (SWG) algorithm block 124. The antennas 138 and 140 may receive the generated outputs from the combiners 134 and 136 and may transmit wireless signals.

The plurality of receive antennas $106_{1...M}$ may each receive at least a portion of the transmitted signal. The SWG 110 may comprise suitable logic, circuitry, and/or code that may be adapted to determine a plurality of weights to be applied to each of the input signals $R_{1...M}$. The SWG 110 may be adapted to modify the phase and amplitude of a portion of the transmitted signals received by the plurality of receive antennas $106_{1...M}$ and generate a plurality of output signals $RF_{1...P}$.

The plurality of RF blocks $114_{1...P}$ may comprise suitable logic, circuitry, and/or code that may be adapted to process an RF signal. The RF blocks $114_{1...P}$ may perform, for example, filtering, amplification, and analog-to-digital (A/D) conversion operations. The plurality of transmit antennas 138 and 140 may transmit the processed RF signals to a plurality of receive antennas $106_{1...M}$. The single weight generator SWG 110 may comprise suitable logic, circuitry, and/or code that may be adapted to determine a plurality of weights, which may be applied to each of the input signals. The single weight generator SWG 110 may be adapted to modify the phase and amplitude of at least a portion of the signals received by the plurality of receive antennas $106_{1...M}$ and generate a plurality of output signals $RF_{1...P}$. The plurality of RF receive blocks $114_{1...P}$ may comprise suitable logic, circuitry and/or code that may be adapted to amplify and convert the received analog RF signals $RF_{1...P}$ down to baseband. The plurality of RF receive blocks $114_{1...P}$ may each comprise an analog-to-digital (A/D) converter that may be utilized to digitize the received analog baseband signal.

The plurality of chip matched filters (CMF) $116_{1...P}$ may comprise suitable logic, circuitry and/or code that may be adapted to filter the output of the plurality of RF receive blocks $114_{1...P}$ so as to produce in-phase (I) and quadrature (Q) components (I, Q). In this regard, in an embodiment of the invention, the plurality of chip matched filters (CMF) $116_{1...P}$ may comprise a pair of digital filters that are adapted to filter the I and Q components to within the bandwidth of WCDMA baseband (3.84 MHz). The outputs of the plurality of chip matched filters (CMF) $116_{1...P}$ may be transferred to the BB processor 126.

The BB 126 may be adapted to receive a plurality of in-phase and quadrature components (I, Q) from a plurality of chip matched filters (CMF) $116_{1...P}$ and generate a plurality of baseband combined channel estimates $\hat{h}_1$ to $\hat{h}_P$. The BB 126 may be adapted to generate a plurality of estimates $\hat{X}_1$ to $\hat{X}_P$ of the original input spatial multiplexing sub-stream signals or symbols $X_1$ to $X_P$. The BB 126 may be adapted to separate the different space-time channels utilizing a Bell Labs Layered Space-Time (BLAST) algorithm, for example, by performing sub-stream detection and sub-stream cancellation. The capacity of transmission may be increased almost linearly by utilizing the BLAST algorithm.

The plurality of cluster path processors CPP $118_{1...P}$ may generate a plurality of baseband combined channel estimates $\hat{h}_1$ to $\hat{h}_P$ that may correspond to the plurality of receive antennas $106_{1...M}$. The channel estimator 122 may comprise suitable logic, circuitry, and/or code that may be adapted to process the received estimates $\hat{h}_1$ to $\hat{h}_P$ from the BB processor 126 and may generate a matrix $\hat{H}$ of processed estimated channels that may be utilized by the single weight generator (SWG) algorithm block 124.

The SWG algorithm block 124 may determine a plurality of amplitude and phase values $A_i$ and $\phi_i$, respectively, which may be utilized by SWG 110 to modify the phase and amplitude of a portion of the transmitted signals received by the plurality of receive antennas $106_{1...M}$ and generate a plurality of output signals $RF_{1...P}$.

Figure 2:
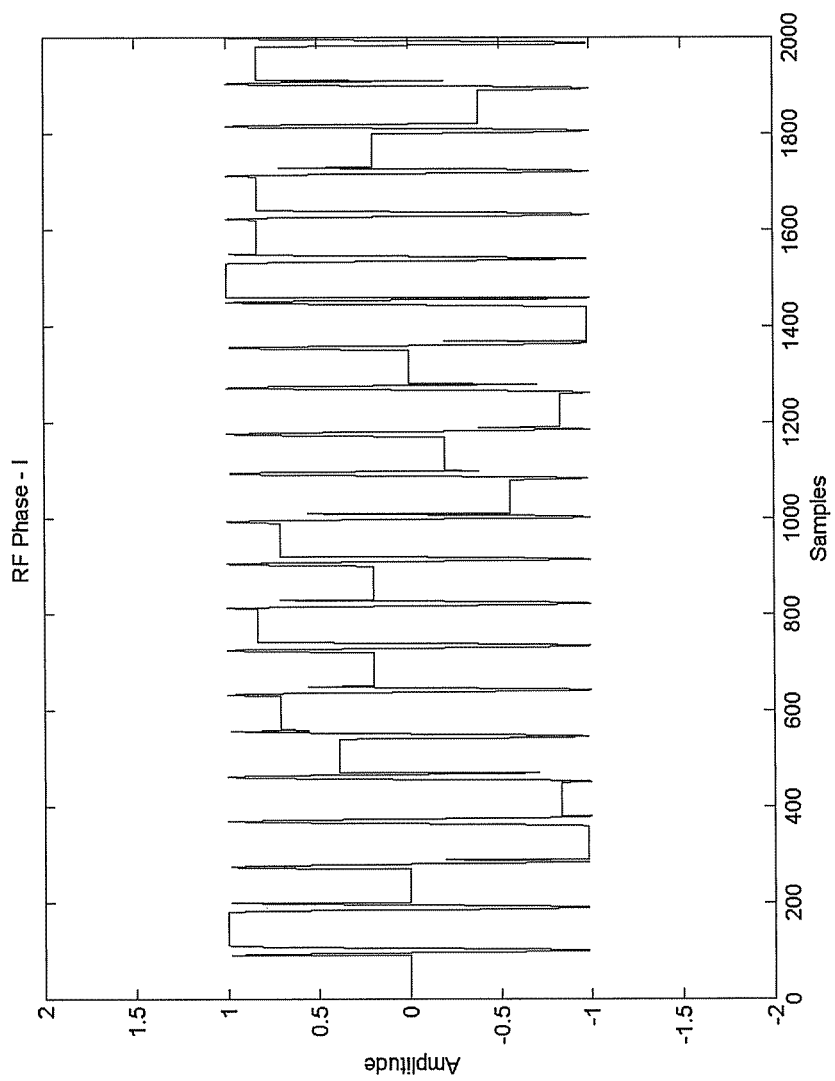
FIG. 2 illustrates an exemplary periodic phase rotation for an I signal component, in accordance with an embodiment of the invention.

FIG. 2 illustrates an exemplary periodic phase rotation for an I signal component, in accordance with an embodiment of the invention. Referring to FIG. 2, for the wireless system 200 in FIG. 1, by rotating the phase at the receive antennas $206_{1...M}$ from 0 to 360 degrees, it may be possible to estimate all propagation channels, $h_{1...M}$, at the same time utilizing complex multiplication and integration. This operation is equivalent to making all the channels at the Rx antennas orthogonal. FIG. 2 illustrates the periodic rotation of the I component in an RF signal.

Figure 3A:
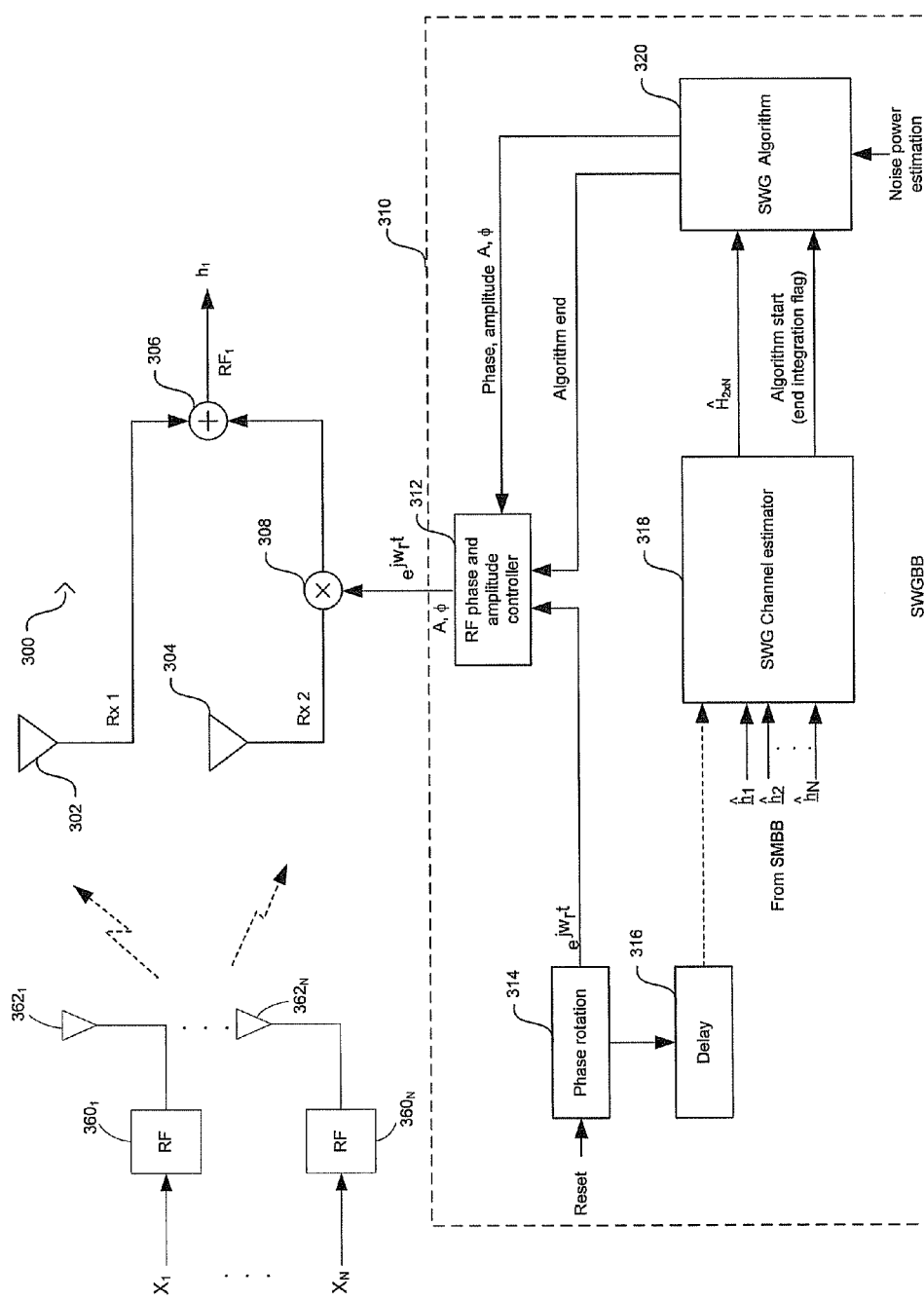
FIG. 3A is a block diagram of an exemplary system for providing phase rotation, channel estimation and for determining optimal phase and amplitude parameters or settings for an additional receive antenna, in accordance with an embodiment of the invention.

FIG. 3A is a block diagram of an exemplary system for providing phase rotation, channel estimation and for determining optimal phase and amplitude parameters or settings for an additional receive antenna, in accordance with an embodiment of the invention. Referring to FIG. 3A, a receiver system 300 may comprise a first receive antenna Rx 1 302, an additional antenna Rx 2 304, a combiner 306, a complex multiplier 308, and a single weight generator baseband (SWGBB) processor 310. The SWGBB processor 310 may comprise a phase rotation start controller block 314, a delay block 316, a SWG channel estimator 318, a single weight generator (SWG) algorithm block 320, and a RF phase and amplitude controller 312. The SWGBB processor 310 provides similar functionality as the SMBB processor 126 in FIG. 1.

The receive antennas Rx 1 302 and Rx 2 304 may each receive a portion of the transmitted signal. The combiner 306 may be adapted to combine the received signals into a single RF signal $RF_1$, for example. The complex multiplier 308 may be adapted to receive a plurality of input signals from the additional receive antenna Rx 2 304 and the RF phase and amplitude controller 312 and may generate an output signal to the combiner 306.

The phase rotation start controller block 314 may comprise suitable logic, circuitry and/or that may be adapted to start after receiving a reset signal and may generate a plurality of output signals to the delay block 316 and the RF phase and amplitude controller 312. The delay block 316 may be adapted to receive an input signal from the phase rotation start controller block 314 and generate a delayed output signal to the SWG channel estimator 318. The SWG channel estimator 318 may comprise suitable logic, circuitry, and/or code that may be adapted to process the received baseband combined channel estimates per transmit antenna $\hat{h}_1 \ldots \hat{h}_N$ from the SMBB processor 126 and may generate a matrix $\hat{H}_{2 \times N}$ of processed estimated channels. The SWG channel estimator 318 may be adapted to generate an algorithm start signal indicating the end of integration that may be utilized by the single weight generator (SWG) algorithm block 320.

The SWG algorithm block 320 may be adapted to receive a plurality of signals from the SWG channel estimator 318, for example, a matrix $\hat{H}_{2 \times N}$ of processed baseband combined channel estimates, an algorithm start signal from the SWG channel estimator 318 and a noise power estimation signal. The SWG algorithm block 320 may generate phase and amplitude correction signals and an algorithm end signal to the RF phase and amplitude controller 312. The RF phase and amplitude controller 312 may be adapted to receive the phase and amplitude values and the algorithm end signal to modify the phase and amplitude of a portion of the transmitted signals received by the receive antenna Rx 2 302 and generate an output signal $RF_1$.

The SWG channel estimator 318 may receive baseband combined channel estimates $\hat{h}_1 \ldots \hat{h}_N$, which may include all transmission channels from N Tx antennas and each Tx antenna may have a different channel estimation sequence, so that the different combined channels $\hat{h}_1 \ldots \hat{h}_N$ may be separated and estimated. The SWG channel estimator 318 may generate a matrix of channel estimates $\hat{H}_{2 \times N}$ to the SWG algorithm block 320. A reset signal may be utilized to start phase rotation block 314. The combined channel estimates from the BB 126 in FIG. 1 may be transferred to the channel estimator 318 for processing. When processing is complete, the SWG channel estimator 318 may indicate to the SWG algorithm block 320 that the determination of the appropriate phase and amplitude correction for the portion of the received signal in the additional antenna Rx 2 304 may start. The SWG algorithm block 320 may utilize an estimation of the noise power and interference in determining the phase and amplitude values in addition to the matrix of channel estimates $\hat{H}_{2 \times N}$. The SWG algorithm block 320 may indicate to the RF phase and amplitude controller 312 the end of the weight determination operation and may then transfer to the RF phase and amplitude controller 312, the determined phase and amplitude values. The RF phase and amplitude controller 312 may then modify the portion of the received signal in the additional antenna Rx 2 304 via the complex multiplier 308.

In operation, the RF phase and amplitude controller 312 may apply the signal $e^{jw_r t}$ to the mixer 308 in FIG. 3A based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signal $Ae^{j\phi}$ to the mixer 308 in FIG. 3A.

Figure 3B:
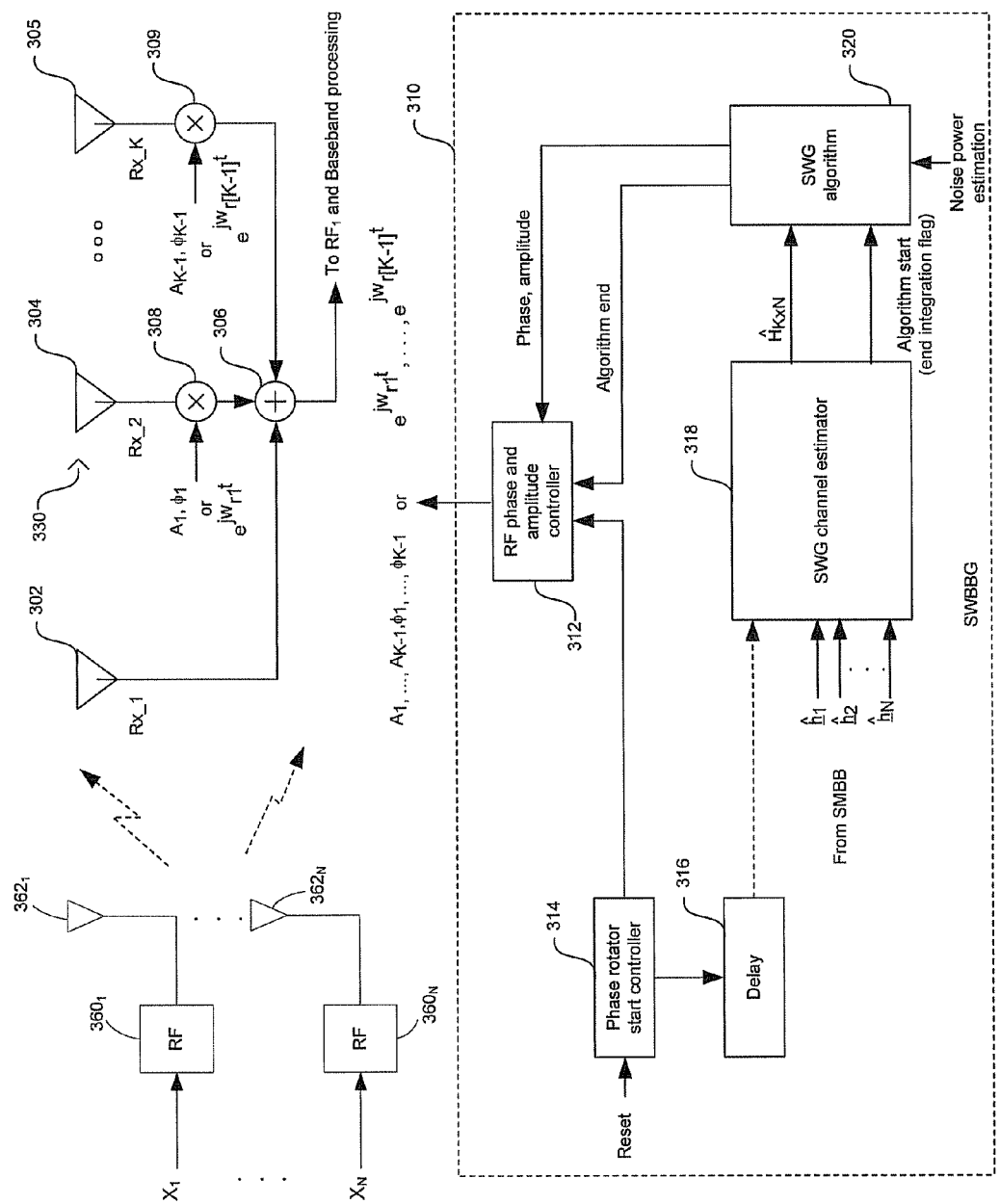
FIG. 3B is a block diagram of an exemplary system for providing phase rotation, channel estimation and for determining optimal phase and amplitude parameters or setting for additional K−1 receive antennas, in accordance with an embodiment of the invention.

FIG. 3B is a block diagram of an exemplary system for providing phase rotation, channel estimation and for determining optimal phase and amplitude parameters or setting for additional K−1 receive antennas, in accordance with an embodiment of the invention. Referring to FIG. 3B, a receiver system 330 may correspond to a portion of the wireless communication system 100 in FIG. 1 and may differ from the receiver system 300 in FIG. 3A in that (K−1) additional receive antennas, Rx_2 304 to Rx_K 305, and (K−1) mixers 308 to 309 may be utilized. The combiner 306 may combine the received signals into a single RF signal $RF_1$, for example. In this regard, the SWG channel estimator 318 may be adapted to process the combined channel estimates, $\hat{h}_1 \ldots \hat{h}_N$, and determine the propagation channel matrix estimate $\hat{H}_{K \times N}$.

Referring to the FIG. 1, multiple receive antennas may be connected to each of the RF chains $RF_1 \ldots RF_N$ as shown in FIG. 3B for the single RF chain $RF_1$. In this regard, the combined channel estimates $\hat{h}_1 \ldots \hat{h}_N$ and consequently the channel estimate matrix $\hat{H}_{K \times N}$ may be determined per each RF chain $RF_1 \ldots RF_N$. Consequently, following this example, N matrices $\hat{H}_{K \times N}$ may form a channel estimate matrix $\hat{H}_{M \times N}$ in FIG. 1 (M=NK).

The SWG algorithm block 320 may also be adapted to determine (K−1) channel weights per RF chain, that may be utilized to maximize receiver SINR, for example, to be applied to the mixers 308 to 309 to modify the portions of the transmitted single channel communication signals received by the additional receive antennas Rx_2 304 to Rx_K 305. The (K−1) channel weights per RF chain may comprise amplitude and phase components, $A_1$ to $A_{K-1}$ and $\phi_1$ to $\phi_{K-1}$. The RF phase and amplitude controller 312 may also be adapted to apply rotation waveforms $e^{jw_{r1}t}$ to $e^{jw_{r(K-1)}t}$ or phase and amplitude components, $A_1$ to $A_{K-1}$ and $\phi_1$ to $\phi_{K-1}$, to the mixers 308 to 309. In this regard, the RF phase and amplitude controller 312 may apply the rotation waveforms or the amplitude and phase components in accordance with the control signals provided by the phase rotator start controller 314 and/or the algorithm end signal generated by the SWG algorithm block 320.

Figure 3C:
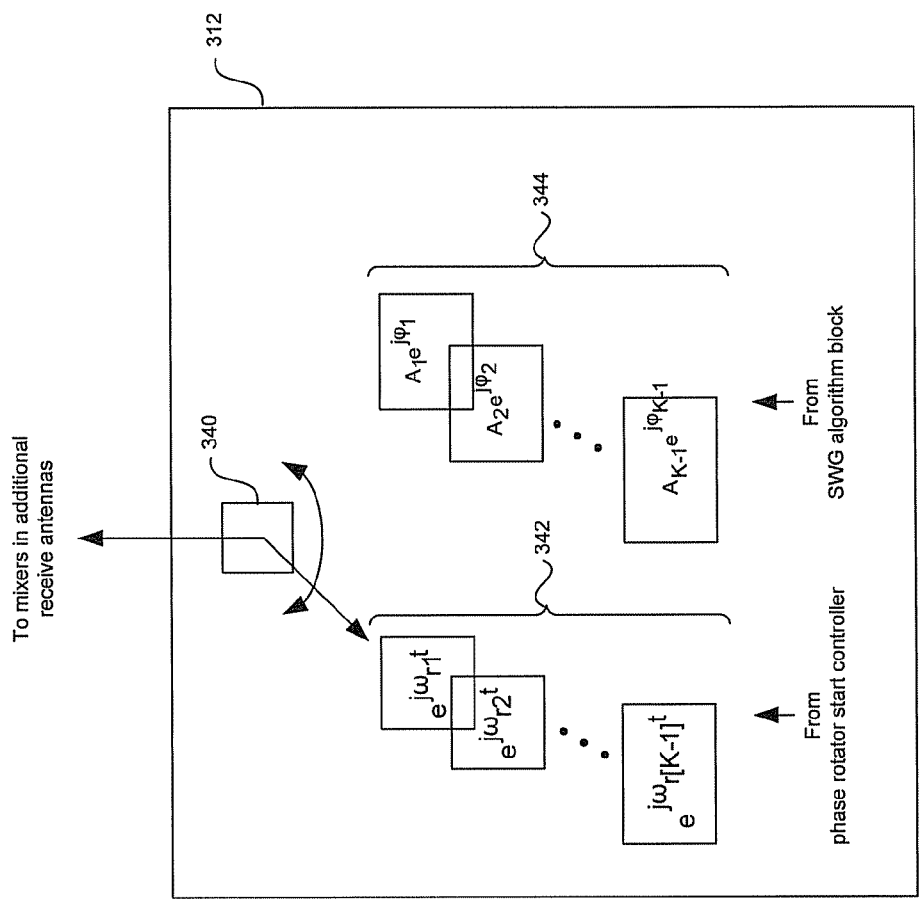
FIG. 3C is a block diagram of an exemplary RF phase and amplitude controller, in accordance with an embodiment of the invention.

FIG. 3C is a block diagram of an exemplary RF phase and amplitude controller, in accordance with an embodiment of the invention. Referring to FIG. 3C, the RF phase and amplitude controller 312 may comprise a switch 340, rotation waveform sources 342, and a plurality of SWG algorithm determined weights 344. The switch 340 may comprise suitable hardware, logic, and/or circuitry that may be adapted to select between the rotation waveforms $e^{jw_{r1}t}$ to $e^{jw_{r(K-1)}t}$ and the SWG algorithm determined weights $A_1 e^{j\phi_1}$ to $A_{K-1} e^{j\phi_{K-1}}$. The rotation waveform source 342 may comprise suitable hardware, logic and/or circuitry that may be adapted to generate the signal $e^{jw_{rk}t}$, where $w_{rk}=2\pi f_{rk}$ and $f_{rk}$ is the rotation frequency that preserves orthogonality of the received signals at the multiple receiving antennas. The rotation frequency that preserves the signal orthogonality at the receiving antennas may be selected as $w_{rk}=kw_r$ where k=1, 2, 3 . . . K−1. Other rotation waveforms such as triangular or square may be utilized with the same frequency relationships. In addition, waveforms representing different orthogonal codes of the same frequency may be utilized, similar to the CDMA orthogonal codes with the same spreading. In this embodiment $e^{jw_{rk}t}$ is used as an exemplary waveform. The weights 344 may comprise suitable hardware, logic, and/or circuitry that may be adapted to generate the signals $A_1 e^{j\phi_1}$ to $A_{K-1} e^{j\phi_{K-1}}$ from the amplitude and phase components, $A_1$ to $A_{K-1}$ and $\phi_1$ to $\phi_{K-1}$, respectively.

In operation, the RF phase and amplitude controller 312 may apply the signals $e^{jw_{r1}t}$ to $e^{jw_{r(K-1)}t}$ to the mixers 308 to 309 in FIG. 3B based on control information provided by the phase rotator start controller 314. The switch 340 may select the rotation waveform source 342 based on the control information provided by the phase rotator start controller 314. Once the channel weights are determined by the SWG algorithm block 320 and the phase and amplitude components have been transferred to the RF phase and amplitude controller 312, the algorithm end signal may be utilized to change the selection of the switch 340. In this regard, the switch 340 may be utilized to select and apply the signals $A_1 e^{j\Phi_1}$ to $A^{K-1} e^{j\Phi_{M-1}}$ to the mixers 308 to 309 in FIG. 3B.

Figure 4:
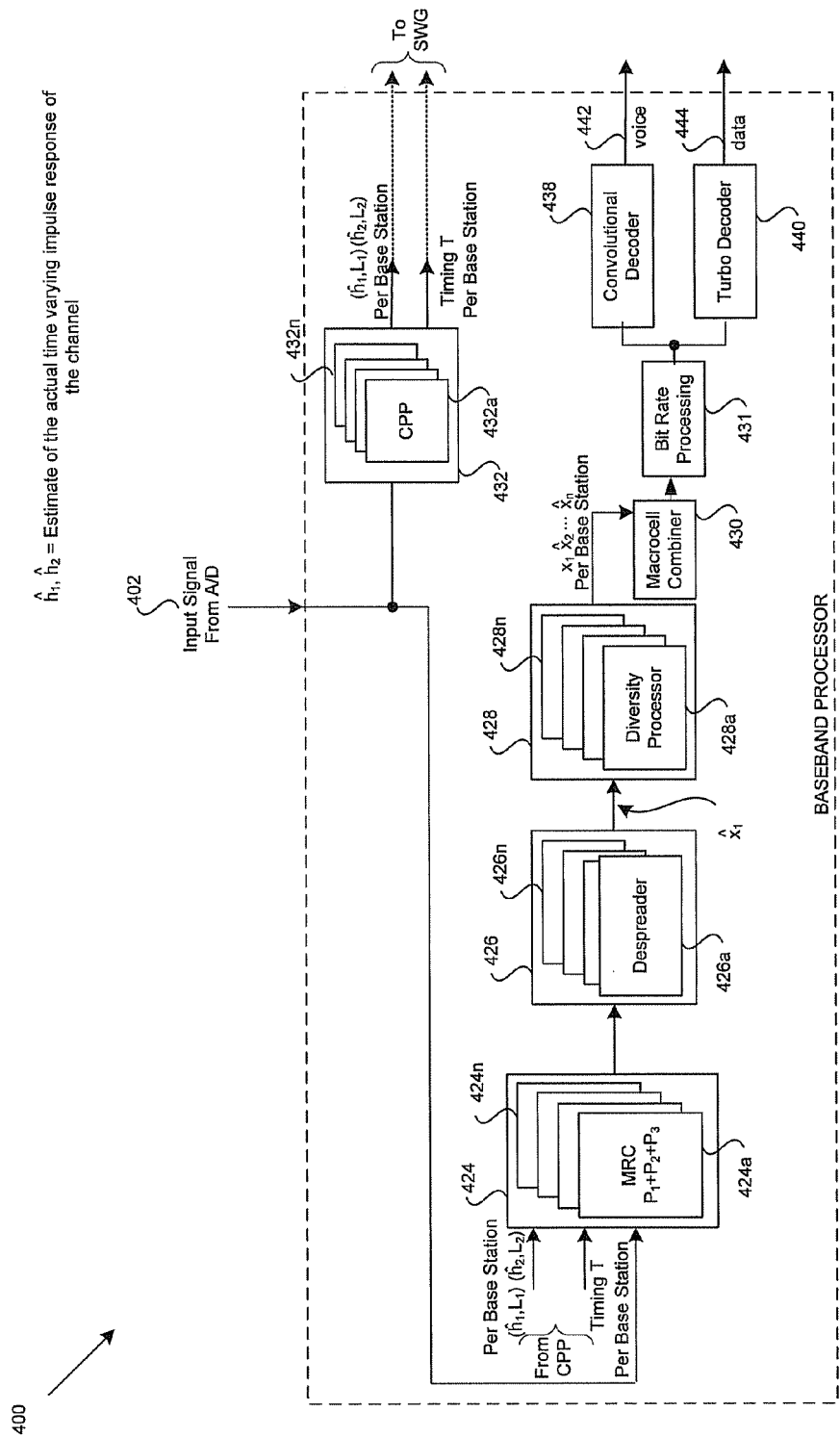
FIG. 4 is a block diagram of an exemplary baseband processor that may be utilized within a MIMO system, in accordance with an aspect of the invention.

FIG. 4 is a block diagram of an exemplary baseband processor that may be utilized within a MIMO system, in accordance with an aspect of the invention. Referring to FIG. 4, the baseband processor 400 may comprise a cluster path processor (CPP) block 432, a maximum ratio combining (MRC) block 424, a despreader block 426, a diversity processor block 428, a macrocell combiner block 430, a bit rate processing block 431, a convolutional decoder block 438, and a turbo decoder block 440.

U.S. application Ser. No. 11/173,854 provides a detailed description of signal clusters and is hereby incorporated herein by reference in its entirety.

The CPP block 432 may comprise a plurality of cluster processors that may be adapted to receive and process an input signal 502 received from a chip matched filter (CMF), for example. In the baseband receiver processor 400, the CPPs 432a, . . . , 432n within the CPP block 432 may be partitioned into pairs of processors, wherein each pair of processor may be adapted to track time-wise and estimate the complex phase and amplitude of the element in the cluster. A cluster may comprise an aggregate of received multipath signals with maximum (max) time difference that may be no more than 16×1/3.84e6 seconds, for example. Under these circumstances, the need for two processors may be derived from the fact that the WCDMA standard facilitates a receiving mode in which the transmitted signal is transmitted over two antennas, which necessitates the two processors. These receiving modes comprise close loop 1 (CL1), close loop 2 (CL2), and STTD. The CPP block 432 may be adapted to determine estimates of the entire transfer function of the channel and may recover channels on a per base station basis.

The CPP block 432 may be adapted to generate channel estimates $\hat{h}_1$ and $\hat{h}_2$ of the actual time varying impulse response of the channel per base station. The CPP 432 may also generate timing information T on per base station basis related to signals received by antennas at the receive side, such as antennas $106_{1...M}$ of FIG. 1E, for example. Corresponding lock indicators $L_1$ and $L_2$ may also be generated by the cluster processors. The lock indicators may provide an indication of which components in the corresponding estimates comprise valid component values. In one embodiment of the invention, cluster path processors 432a, . . . , 432n may be configured to operate in pairs when a transmitted signal is transmitted by two antenna, where the two antenna may be located in the same base station, or at different base stations. The channel estimates $\hat{h}_1$ and $\hat{h}_2$ of the actual time varying impulse response of the channel per base station, as well as lock indicators L1 and L2, and the timing information T per base station may be communicated to a single weight generation (SWG) block, for example, as well as to the maximum-ratio combining (MRC) block 424 for further processing. The channel estimates $\hat{h}_1$ and $\hat{h}_2$, the lock indicators L1 and L2, and the timing information T may be utilized by an SWG block for generating a single weight (SW) control signal for phase shifting of one or more signals received by receiver antennas.

The maximum-ratio combining block 424 may comprise suitable logic, circuitry and/or code to receive timing reference signals, T, and channel estimates and lock indicators, ($\hat{h}1$, L1) and ($\hat{h}2$, L2), from the corresponding cluster path processor block 432, which may be utilized by the maximum-ratio combining block 424 to process received signals from a chip matched filter (CMF) block, for example. The maximum ratio combining block 424 may utilize channel estimate components that are valid in accordance with the corresponding lock indicator. Channel estimate components that are not valid, in accordance with the corresponding lock indicator, may not be utilized. The maximum-ratio combining block 424 may be adapted to provide a combining scheme or mechanism for implementing a rake receiver which may be utilized with adaptive antenna arrays to combat noise, fading, and/or co-channel interference.

In accordance with an embodiment of the invention, the maximum-ratio combining block 424 may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon a maximum ratio combiner. A maximum ratio combiner is a diversity combiner in which each of multipath signals from all received multipaths are added together, each with unique gain. The gain of each multipath before summing can be made proportional to received signal level for the multipath, and inversely proportional to the multipath noise level. Each of the maximum-ratio combining blocks may be also adapted to utilize other techniques for signal combining such selection combiner, switched diversity combiner, equal gain combiner, or optimal combiner.

In one embodiment of the invention, the assignment of fingers in the maximum-ratio combining block 424 may be based on channel estimates h1 and h2 from the cluster path processor block 432. The proportionality constants utilized in the maximum-ratio combining block 424 may be based on the valid channel estimates, $\hat{h}1$ and $\hat{h}2$, from the cluster path processor block 432.

The despreader (DS) block 426 may comprise a plurality of despreader blocks 426a, . . . , 426n. Each of the despreader blocks 426a, . . . , 426n may comprise suitable logic, circuitry, and/or code that may be adapted to despread received signals that may have been previously spread through the application of orthogonal spreading codes in the transmitter. Prior to transmission of an information signal, known as a "symbol", the transmitter may have applied an orthogonal spreading code that produced a signal Comprising a plurality of chips. The DS block 426 may be adapted to generate local codes, for example Gold codes or orthogonal variable spreading factor (OVSF) codes, that may be applied to received signals through a method that may comprise multiplication and accumulation operations. Processing gain may be realized after completion of integration over a pre-determined number of chips in which the symbol is modulated.

Following despreading at the receiver, the original symbol may be extracted. WCDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which may be equivalent to the code that was utilized for generating the spread spectrum signal. Similarly to the CPP block 432 and the MRC block 424, the DS block 426 may be assigned on a per base station basis, with the MRC block 424 communicating with the DS block 426 that may be assigned to the same base stations.

The diversity processor 428, comprising a plurality of diversity processor blocks 428a, . . . , 428n, may comprise suitable logic, circuitry, and/or code that may be adapted to combine signals transmitted from multiple antennas in diversity modes. The diversity modes may comprise OL, CL1 and CL2. The diversity processor 428 may combine signals transmitted from multiple antennas that are located at the same base station. Similarly with the cluster path processors 432, the maximum-ratio combining blocks 424, and the despreader blocks 426, the diversity processors 428 may be assigned on a per base station basis, with the diversity processors 428 communicating with despreader blocks 426 that may be assigned to the same base stations.

The macrocell combiner 430 may comprise suitable logic, circuit and/or code and may be adapted to achieve macroscopic diversity. The macroscopic diversity scheme may be utilized for combining two or more long-term lognormal signals, which may be obtained via independently fading paths received from two or more different antennas at different base-station sites. The microscopic diversity schemes may be utilized for combining two or more short-term Rayleigh signals, which are obtained via independently fading paths received from two or more different antennas but only one receiving site.

The bit rate processing block 431 may comprise suitable logic, circuitry and/or code to process frames of data received from the macrocell combiner 430. The processing may further comprise depuncturing, and deinterleaving data in the received frame, and further determining a rate at which processed frames are communicated in output signals.

The convolutional decoder 438 may comprise suitable logic, circuitry and/or code that may be utilized to handle decoding of convolutional codes as indicated in the 3GPP specification. The output of the convolutional decoder may be a digital signal, which comprises voice information, suitable for processing by a voice-processing unit. The turbo decoder 440 may comprise suitable logic, circuitry and/or code that may be utilized to handle decoding of turbo codes as indicated in the 3GPP specification. The output of the turbo decoder 440 may be a digital signal, which has data information, such that it may be suitable for use by a video display processor.

The maximum-ratio combining block 424 may be adapted to utilize the channel estimates and lock indicators ($\hat{h}1$, L1), ($\hat{h}2$, L2) and timing information T per base station to assign rake fingers to received individual distinct path signals and to assign proportionality constants to each finger. Received individual distinct path signals may be processed in the maximum-ratio combining block 424 as signal clusters comprising a plurality of received individual distinct path signals. In an embodiment of the invention, the maximum-ratio combining block 424 may assign a time, T(n), to the nth grid element of the CPP 432, where the plurality of times T(n) may be based on the timing reference T. Given a time assignment, and a time offset, toff, a given CPP 432, n, may detect an individual distinct path signal that is received during a time interval starting at [T(n)−toff/2], and ending at [T(n)+toff/2].

The individual distinct path signals received collectively for each CPP 432 may constitute a signal cluster. The relationship of the values T(n) among the processing elements of the CPP 432 in the receiver may be such that T(n+1)−T(n) is equal to a constant value for values of n among the set of fingers. Thus, once T is determined, the timing relationships for the receipt of the plurality of individual distinct path signals constituent in the signal cluster may be determined.

The time offset value, toff, may represent a time duration, which is at least as long as the period of time required for transmitting the plurality of chips contained in a symbol. For example, if the symbol comprises 16 chips, and the W-CDMA chip rate is 3.84×106 chips/second, then the time offset toff may be (16/3.84×106) seconds or approximately 4 microseconds.

Embodiments of the invention may not be limited to values of the difference T(n+1)−T(n) being constant among all n fingers in a rake receiver. However, each value, T(n), may be based on the timing reference signal, T.

The maximum-ratio combining block 424 may proportionately scale and add the received individual distinct path signals to produce a chip level output, which may be communicated to the despreader block 426. The despreader block 426 may be adapted to despread the chip level signal received from the maximum-ratio combining block 424 to generate estimates of the original transmitted signals. The diversity processor block 428 may be adapted to provide diversity processing and to generate output data estimates on a per base station basis. The macrocell combiner block 430 may achieve macroscopic diversity when a received signal has been transmitted by a plurality of base stations. The bit rate processing block 431 may perform processing tasks comprising depuncture and deinterleave on received frames of data that are communicated in received individual distinct path signals. The bit rate processing block 431 may determine a rate at which to communicate processed frames of data to the convolutional decoder block 438, and/or the turbo decoder block 440. The convolution decoder block 438 may be adapted to perform convolutional decoding on the voice portion of the signal generated from an output of the bit rate processing block 431. The turbo decoder block 440 may be adapted to perform turbo decoding on the data portion of the signal generated from an output of the bit rate processing block 431.

Figure 5:
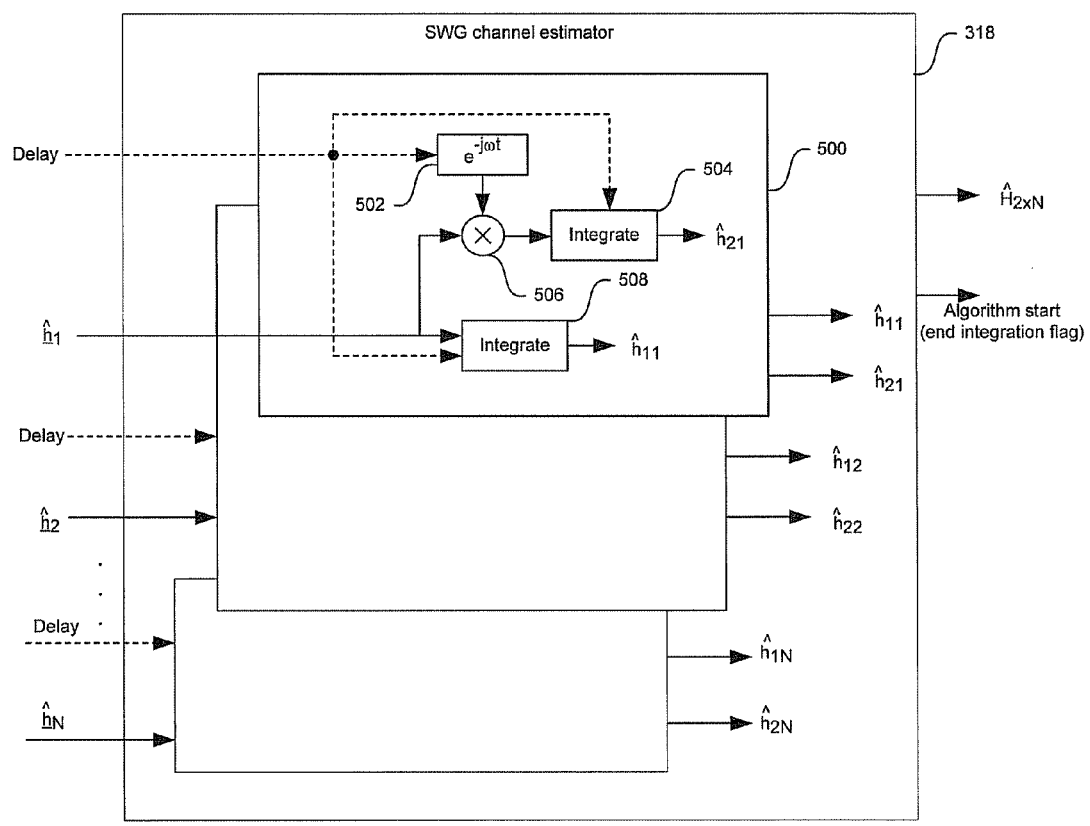
FIG. 5 is a block diagram of an exemplary system for determining channel estimation, in accordance with an embodiment of the invention.

FIG. 5 is a block diagram of an exemplary system for determining channel estimation, in accordance with an embodiment of the invention. Referring to FIG. 5, the SWG channel estimator 500 may comprise a phase rotator 502, a complex combiner 506, a first integrator 504 and a second integrator 508.

The SWG channel estimator 500 may comprise suitable logic, circuitry and/or code that may be adapted to receive a delay signal and channel estimates $\hat{h}_1 \ldots \hat{h}_N$ and generate a matrix of baseband combined channel estimates $\hat{H}_{2 \times N}$ and an algorithm start signal to the SWG algorithm block 320 (FIG. 3A). The phase rotator 502 may comprise suitable circuitry, logic and/or code that may be adapted to receive a delay signal and generate an output signal to the complex combiner 506. The complex combiner 506 may be adapted to receive a plurality of signals from the phase rotator 502 and the channel estimate $\hat{h}_1$ and generate a phase rotated output of the channel estimate $\hat{h}_1$ to the first integrator 504. The first integrator 504 may comprise suitable logic, circuitry and/or code that may be adapted to receive at least a delay signal and the output generated by the complex combiner 506. Based on these received inputs, the first integrator 504 may generate a channel estimate between the first transmit antenna Tx_1 302 and the second receive antenna Rx_2 304, $\hat{h}_{21}$, to the SWG algorithm block 320 (FIG. 3A). The second integrator 508 may comprise suitable logic, circuitry and/or code that may be adapted to receive at least a delay signal and the channel estimate and generate a channel estimate between the first transmit antenna Tx_1 302 and the first receive antenna Rx_1 302, $\hat{h}_{11}$, to the SWG algorithm block 320 (FIG. 3A). Similarly, the channels between the remaining transmit antennas and the two receiving antennas Rx$_{\_1}$ 302 and Rx$_{\_2}$ 304 may be estimated.

In operation, as an example, the channel estimator 500 may determine, at the baseband, a combined estimate of the two baseband combined channel estimates between the two receive antennas and the first transmit antenna Tx_1 (FIG. 3A) as:

$$\hat{h}_1 = \hat{h}_{11} + e^{jw_r t}\hat{h}_{21},$$

where $w_r = 2\pi f_r$ and $f_r$ is the rotation frequency. A channel estimate of the first receive antenna ($\hat{h}_{11}$) may be determined by taking the expected value or integration of $\hat{h}_1$ over a 0-360 degree rotation so that:

$$\hat{h}_{11} = E[\hat{h}_{11} + e^{jw_r t}\hat{h}_{21}] = \hat{h}_{11} + E[e^{jw_r t}\hat{h}_{21}],$$

where $E[e^{jw_r t}\hat{h}_{21}]$ over a full rotation is equal to zero. Channel estimate of the second antenna ($\hat{h}_{21}$) may be determined by taking the expected value or integration of $\hat{h}_1$ multiplied by a complex conjugate of the rotation waveform over a 0-360 degree rotation period. In this case, the channel estimate may be expressed as:

$$\hat{h}_{21} = E[e^{-jw_r t}\hat{h}_1] = E[e^{-jw_r t}(\hat{h}_{11} + e^{jw_r t}\hat{h}_{21})] = E[e^{-jw_r t}\hat{h}_{11}] + \hat{h}_{21}] = E[e^{-jw_r t}\hat{h}_{11}] + \hat{h}_{21},$$

where $E[e^{-jw_r t}\hat{h}_{11}]$ over a full rotation is equal to zero. Similarly, channel estimates related to the combined channel estimates $\hat{h}_2 \ldots \hat{h}_N$ can be determined to obtain the matrix of channel estimates $\hat{H}_{2\times N}$. Following this example, the matrix of channel estimates $\hat{H}_{K\times N}$ of FIG. 3B may be determined similarly by integration or multiplication by the complex conjugate of the rotation waveforms $e^{jw_{r1}t}$ to $e^{jw_{r(K-1)}t}$ and integration. In addition, the above channel estimator operation example may be extended to M receive antenna system with N RF chains RF$_1$ . . . RF$_N$ to form the propagation channel estimate matrix $\hat{H}_{M\times N}$ of FIG. 1. The actual time varying channel impulse response estimates $\hat{h}_{xy}$ may comprise multiple propagation paths arriving at different delays. In that regard, the matrix $\hat{H}_{M\times N}$ of the propagation channel estimates may consist of multiple path estimates arriving at different delays. For each path arriving at a different delay, channel matrix estimate $\hat{H}_{M\times N}$ may be determined following the channel estimator 500 operation for each path.

The matrix $\hat{H}_{2\times N}$ may be represented as:

$$\hat{H}_{2\times N} = \begin{bmatrix} \hat{h}_{11} & \hat{h}_{12} & \ldots & \hat{h}_{1N} \\ \hat{h}_{21} & \hat{h}_{22} & \ldots & \hat{h}_{2N} \end{bmatrix}$$

Rotation on the additional antennas may be performed continuously, but a preferred embodiment is to perform the rotation periodically, as shown in FIG. 2. A continuous rotation may be perceived by the modem as a high Doppler, and for some modem implementations this may decrease the modem performance. The period between consecutive rotations may depend on the Doppler frequency. At a higher Doppler frequency, it may be necessary to more frequently track the channel, while at a lower Doppler frequency, tracking may be less frequent. The period may also depend on the desired modem performance and channel estimation accuracy. For example, if the Doppler frequency is 5 Hz, then a period between consecutive rotations of 1/50 sec. may be chosen. This results in 10 rotations or channel estimations per signal fade. The time duration of the rotation itself may be selected based on the channel estimation accuracy and corresponding modem performance. Generally, longer rotation time results in a better channel estimate because of the longer integration period.

The antenna rotation technique may be extended to multiple receive antennas (K) belonging to a single RF chain, RF$_1$ of FIG. 1 for example, as shown in the wireless system in FIG. 3B. In that case, K−1 antenna multiplying waveforms may be used which are orthogonal to each other.

Figure 6:
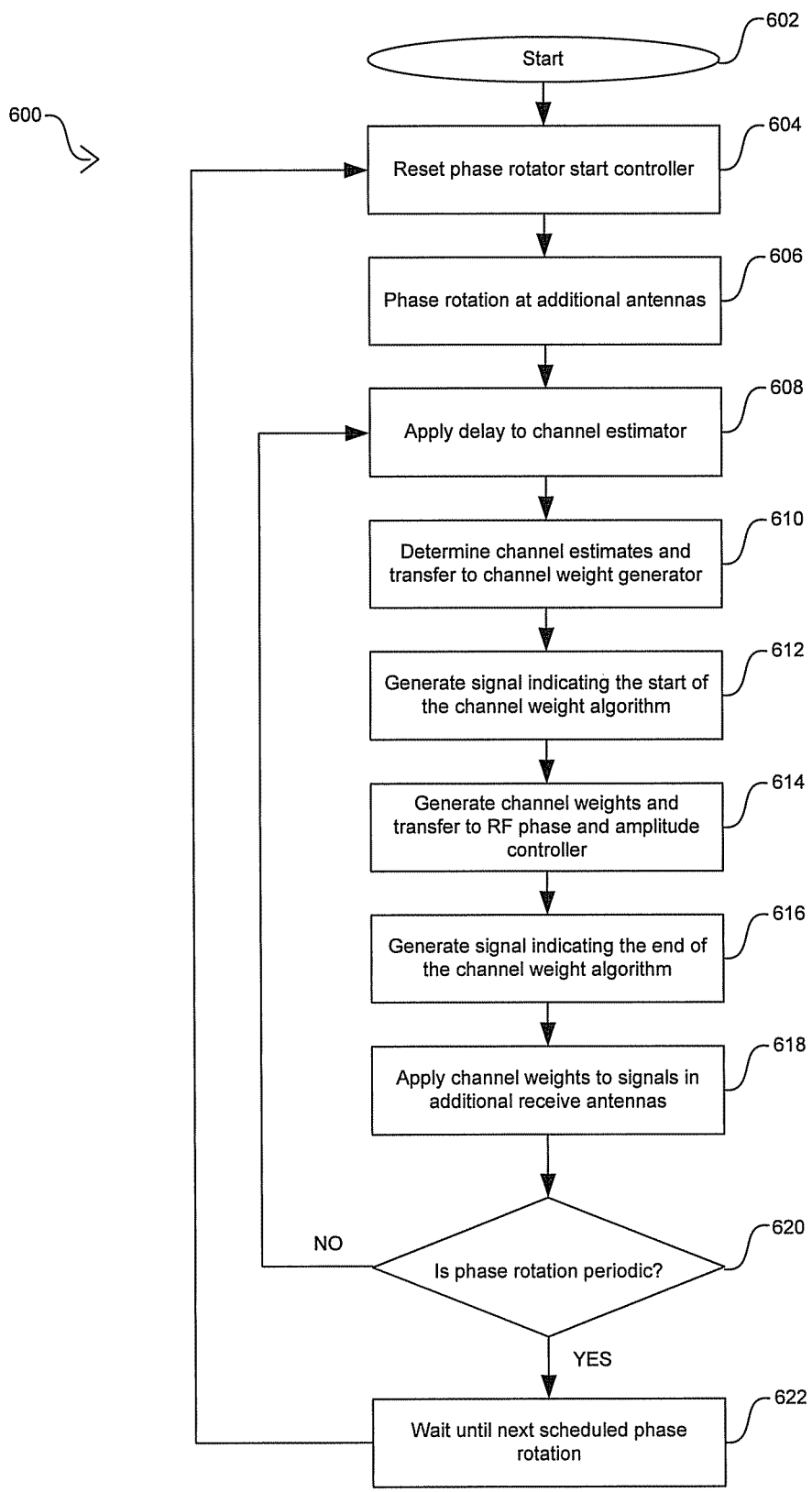
FIG. 6 is a flow diagram illustrating exemplary steps in the operation of the single weight baseband generator (SWBBG) that may be utilized for channel estimation in a 2-Tx and M-Rx antennas system, in accordance with an embodiment of the invention.

FIG. 6 is a flow diagram illustrating exemplary steps in the operation of the single weight baseband generator (SWBBG) that may be utilized for channel estimation in a 2-Tx and M-Rx antennas system, in accordance with an embodiment of the invention. Referring to FIG. 6, after start step 602, in step 604, the phase rotator start controller 314 in FIG. 3B may receive the reset signal to initiate operations for determining propagation channel estimates and channel weights in the SWBBG 310. The phase rotator start controller 314 may generate control signals to the delay block 316 and to the RF phase and amplitude controller 312. The control signals to the delay block 316 may be utilized to determine a delay time to be applied by the delay block 316. The control signals to the RF phase and amplitude controller 312 may be utilized to determine when to apply the rotation waveforms that have been modified by the channel weights to the mixers 308 to 309.

In step 606, the RF phase and amplitude controller 312 may apply rotation waveforms, such as those provided by the rotation waveform sources 342 in FIG. 3C, to the mixers 308 to 309 in FIG. 3B. In step 608, the delay block 316 may apply a time delay signal to the SWG channel estimator 318 to reflect the interval of time that may occur between receiving the single channel communication signals and when the first and second baseband combined channel estimates, $\hat{h}_1$ and $\hat{h}_2$, are available to the SWG channel estimator 318. For example, the time delay signal may be utilized as an enable signal to the SWG channel estimator 318, where the assertion of the time delay signal initiates operations for determining propagation channel estimates. In step 610, the SWG channel estimator 318 may process the first and second baseband combined channel estimates, $\hat{h}_1$ and $\hat{h}_2$, and may determine the matrix $\hat{H}_{K\times 2}$ of propagation channel estimates $\hat{h}_{11}$ to $\hat{h}_{K1}$ and $\hat{h}_{12}$ to $\hat{h}_{K2}$. The SWG channel estimator 318 may transfer the propagation channel estimates $\hat{h}_{11}$ to $\hat{h}_{K1}$ and $\hat{h}_{12}$ to $\hat{h}_{K2}$ to the SWG algorithm block 320. In step 612, the SWG channel estimator 318 may generate the algorithm start signal and may assert the signal to indicate to the SWG algorithm block 320 that it may initiate operations for determining channel weights.

In step 614, the SWG algorithm block 320 may determine the channel weights comprising phase and amplitude components, $A_{K-1}$ and $\phi_1$ to $\phi_{K-1}$, based on the propagation channel estimates $\hat{h}_{11}$ to $\hat{h}_{K1}$ and $\hat{h}_{12}$ to $\hat{h}_{K2}$ and/or noise power estimates, for example. The SWG algorithm block 320 may transfer the channel weights to the RF phase and amplitude controller 312. In some instances, the SWG algorithm block 320 may also generate the weight factors $W_1$ and/or $W_2$. In step 616, the SWG algorithm block 320 may generate the algorithm end signal to indicate to the RF phase and amplitude controller 312 that the channel weights are available to be applied to the mixers 308 to 309. In step 618, the RF phase and amplitude controller 312 may apply the rotation waveforms with phase and amplitude components, $A_{K-1}$ and $\phi_1$ to $\phi_{K-1}$, to the mixers 308 to 309, in accordance with the control signals provided by the phase rotator start controller 314.

In step 620, the receiver system 330 in FIG. 3B may determine whether the phase rotation operation on the received single channel communication signals is periodic. When the phase rotation operation is not periodic but continuous, the process may proceed to step 608 where a delay may be applied to the SWG channel estimator 318. In instances when the phase rotation operation is periodic, the process may proceed to step 622 where the receiver system 330 may wait until the next phase rotation operation is initiated by the reset signal. In this regard, the process control may proceed to step 604 upon assertion of the reset signal to the phase rotator start controller 314.

Figure 7:
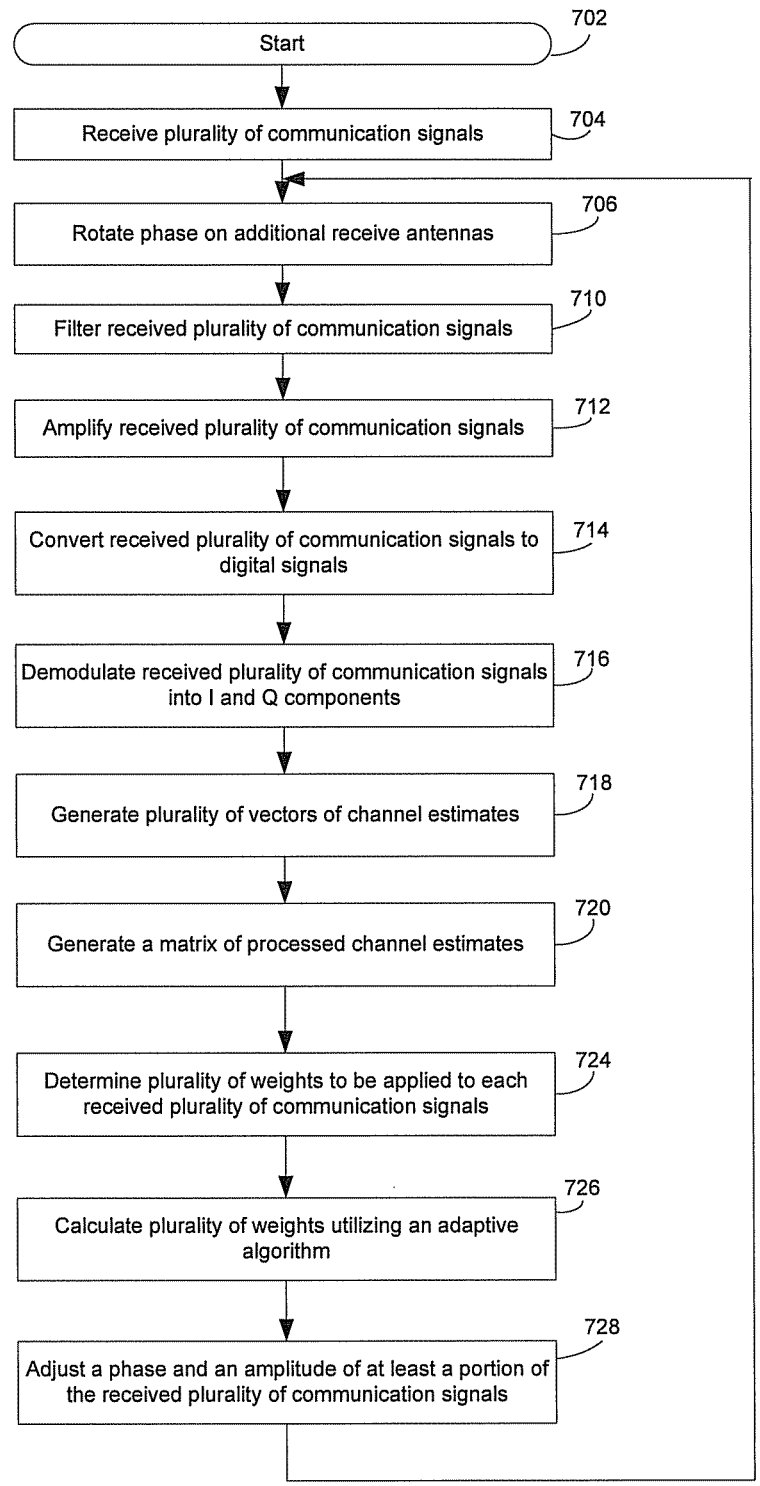
FIG. 7 is a flowchart illustrating exemplary steps that may be utilized for channel estimation in a wireless communication system, in accordance with an embodiment of the invention.

FIG. 7 is a flowchart illustrating exemplary steps that may be utilized for channel estimation in a wireless communication system, in accordance with an embodiment of the invention. Referring to FIG. 7, the exemplary steps may start at step 702. In step 704, a plurality of communication signals may be received by a plurality of receive antennas. In step 706, the phase at the additional antennas may be rotated. In step 710, a low pass filter may filter the received plurality of communication signals. In step 712, a low noise amplifier may amplify the received plurality of communication signals. In step 714, an analog to digital converter may convert the received plurality of communication signals into digital signals. In step 716, a chip matched filter may modulate the received plurality of communication signals into in phase (I) and quadrature (Q) components.

In step 718, a plurality of vectors of baseband combined channel estimates $\hat{h}_1 \ldots \hat{h}_N$ may be generated by a baseband processor. In step 720, a $\hat{H}_{M \times N}$ of processed baseband combined channel estimates may be generated based on receiving the generated plurality of vectors of baseband combined channel estimates. In step 724, a weight generator may determine a plurality of weights that may be applied to each of the received plurality of communication signals to maximize the receiver signal-to interference-to-noise-ratio (SINR), for example. In step 726, the plurality of weights may be calculated by utilizing an adaptive algorithm, for example, a least mean squares algorithm. In step 728, the baseband processor may be adapted to adjust a phase and an amplitude of at least a portion of the received plurality of communication signals based on the generated plurality of amplitude and phase correction signals $A_i$ and $\phi_i$ respectively and the generated plurality of amplitude and phase correction signals $A_i$ and $\phi_i$ respectively may be applied to the mixers at receiving antennas. Control then passes to step 606 for periodic channel estimation and amplitude and phase correction.

Another embodiment of the invention may provide a machine-readable storage, having stored thereon, a computer program having at least one code section executable by a machine, thereby causing the machine to perform the steps as described above for channel estimation in a multi-input multi-output (MIMO) system.

In another embodiment of the invention a system for channel estimation in a communication system may be provided. With reference to FIG. 1E, a plurality of receive antennas $108_1 \ldots_M$ may be adapted to receive a plurality of communication signals from a plurality of transmit antennas $106_1 \ldots_N$. A baseband processor BB 118 may be adapted to generate a plurality of baseband combined channel estimates $\hat{h}_1$ to $\hat{h}_P$ and a plurality of estimates $\hat{X}_1$ to $\hat{X}_P$ of the original input signals $X_1$ to $X_P$ based on phase rotation in response to receiving the plurality of communication signals $RF_1 \ldots_P$. The single weight baseband processor SWGBB 121 may generate a matrix of processed baseband combined channel estimates $\hat{H}$ based on receiving the generated plurality of vectors of baseband combined channel estimates $\hat{h}_1$ to $\hat{h}_P$.

The single weight baseband processor SWGBB 121 may generate a plurality of amplitude and phase correction signals $A_i$ and $\phi_i$ based on the generated plurality of vectors of baseband combined channel estimates $\hat{h}_1$ to $\hat{h}_P$. The SWG 110 may utilize the generated plurality of amplitude and phase correction signals to modify the phase and amplitude of at least a portion of the transmitted signals received by the plurality of receive antennas $108_1 \ldots_M$ and generate a plurality of output signals $RF_1 \ldots_P$. The single weight baseband processor SWGBB 121 may be adapted to adjust a phase and an amplitude of at least a portion of the received plurality of communication signals based on the generated plurality of amplitude and phase correction signals $A_i$ and $\phi_i$ respectively.

A weight generator SWG 110 may determine a plurality of weights that may be applied to each of the received plurality of communication signals based on the generated plurality of amplitude and phase correction signals. The single weight baseband processor SWGBB 121 may be adapted to adjust a phase and an amplitude of at least a portion of the received plurality of communication signals based on the determined plurality of weights. The baseband processor SWGBB 121 may be adapted to calculate the determined plurality of weights by utilizing an adaptive algorithm. The adaptive algorithm may be a least mean squares algorithm, for example. A low noise amplifier may be adapted to amplify the received plurality of communication signals. The cluster path processors $116_1 \ldots_P$ may be adapted to generate the plurality of vectors of baseband combined channel estimates $\hat{h}_1$ to $\hat{h}_P$ via rotation at additional antennas. The system may comprise circuitry that may be adapted to modulate the received plurality of communication signals into in phase (I) components and quadrature (Q) components.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for channel estimation in communication system, the method comprising:
generating a plurality of vectors of baseband combined channel estimates based on phase rotation of a received plurality of communication signals, said phase rotation being determined based on orthogonalization of channels associated with said received plurality of communication signals;
generating a plurality of amplitude correction signals based on said generated plurality of vectors of baseband combined channel estimates; and
adjusting an amplitude of a portion of said received plurality of communication signals based on a portion of said generated plurality of amplitude correction signals,
wherein at least one step of said method is performed by at least one hardware device.

2. The method according to claim 1, further comprising:
receiving said plurality of communication signals from a plurality of transmit antennas.

3. The method according to claim 1, farther comprising:
generating a matrix of processed baseband combined channel estimates based on said generated plurality of vectors of baseband combined channel estimates.

4. The method according to claim 1, further comprising:
determining a plurality of weights to be applied to each of said received plurality of communication signals based on said generated plurality of amplitude correction signals.

5. The method according to claim 4, wherein the step of adjusting comprises:
adjusting said amplitude based on said determined plurality of weights.

6. The method according to claim 4, further comprising:
calculating said determined plurality of weights by utilizing an adaptive algorithm.

7. The method according to claim 6, wherein the step of adjusting comprises:
calculating said determined plurality of weights using a least mean squares algorithm.

8. The method according to claim 1, wherein the step of generating said plurality of vectors of baseband combined channel estimates comprises:
generating said plurality of vectors of baseband combined channel estimates via rotation at additional antennas.

9. The method according to claim 1, further comprising:
modulating said received plurality of communication signals into in phase (I) components and quadrature (Q) components.

10. A method for channel estimation in a communication system, comprising:
generating a plurality of vectors of baseband combined channel estimates based on phase rotation of a received plurality of communication signals, said phase rotation being determined based on orthogonalization of channels, associated with said received plurality of communication signals;
generating a plurality of phase correction signals based on said generated plurality of vectors of baseband combined channel estimates; and
adjusting a phase of a portion of said received plurality of communication signals based on a portion of said generated plurality of phase correction signals,
wherein at least one step of said method is performed by at least one hardware device.

11. A system for channel estimation in a communication system, comprising:
one or more circuits for use in a receiver, said one or more circuits being configured to:
generate a plurality of vectors of baseband combined channel estimates based on phase rotation of a received plurality of communication signals, said phase rotation being determined based on orthogonalization of channels associated with said received plurality of communication signals;
generate a plurality of amplitude correction signals based on said generated plurality of vectors of baseband combined channel estimates; and
adjust an amplitude of a portion of said received plurality of communication signals based on a portion of said generated plurality of amplitude correction signals.

12. The system according to claim 11, wherein said one or more circuits are further configured to receive said plurality of communication signals from a plurality of transmit antennas.

13. The system according to claim 11, wherein said one or more circuits are further configured to generate a matrix of processed baseband combined channel estimates based on said generated plurality of vectors of baseband combined channel estimates.

14. The system according to claim 11, wherein said one or more circuits are further configured to determine a plurality of weights to be applied to each of said received plurality of communication signals based on said generated plurality of amplitude correction signals.

15. The system according to claim 14, wherein said one or more circuits are configured to adjust said amplitude based on said determined plurality of weights.

16. The system according to claim 14, wherein said one or more circuits are further configured to calculate said determined plurality of weights by utilizing an adaptive algorithm.

17. The system according to claim 16, wherein said adaptive algorithm is a least mean squares algorithm.

18. The system according to claim 11, wherein said one or more circuits are configured to generate said plurality of vectors of baseband combined channel estimates via rotation at additional antennas.

19. The system according to claim 11, wherein said one or more circuits are further configured to modulate said received plurality of communication signals into in phase (I) components and quadrature (Q) components.

20. The system according to claim 11, wherein said one or more circuits are further configured to adjust a phase of said portion of said received plurality of communication signals based on a portion of a generated plurality of phase correction signals, wherein said generated plurality of phase control signals are generated based on said generated plurality of vectors of baseband combined channel estimates.

* * * * *

UNITED STATES PATENT AND TRADEMARK OFFICE
CERTIFICATE OF CORRECTION

PATENT NO.       : 8,416,896 B2
APPLICATION NO.  : 13/327027
DATED            : April 9, 2013
INVENTOR(S)      : Kent et al.

Page 1 of 1

It is certified that error appears in the above-identified patent and that said Letters Patent is hereby corrected as shown below:

Title Page, Item (75), replace "Uri M Landau" with --Uri M. Landau--.

In the Claims:

Column 21, Line 2, replace "in communication" with --in a communication--.

Column 21, Line 18, replace "comprising;" with --comprising:--.

Column 21, Line 21, replace "farther" with --further--.

Column 21, Lines 55-56, "channels," should be replaced with --channels--.

Signed and Sealed this
Eleventh Day of June, 2013

Teresa Stanek Rea
*Acting Director of the United States Patent and Trademark Office*